Oct. 4, 1966 D. G. GALLAGHER 3,276,512
COVER FOR THE INTERIOR OF AN AUTOMOBILE
Filed Dec. 16, 1963 2 Sheets-Sheet 1
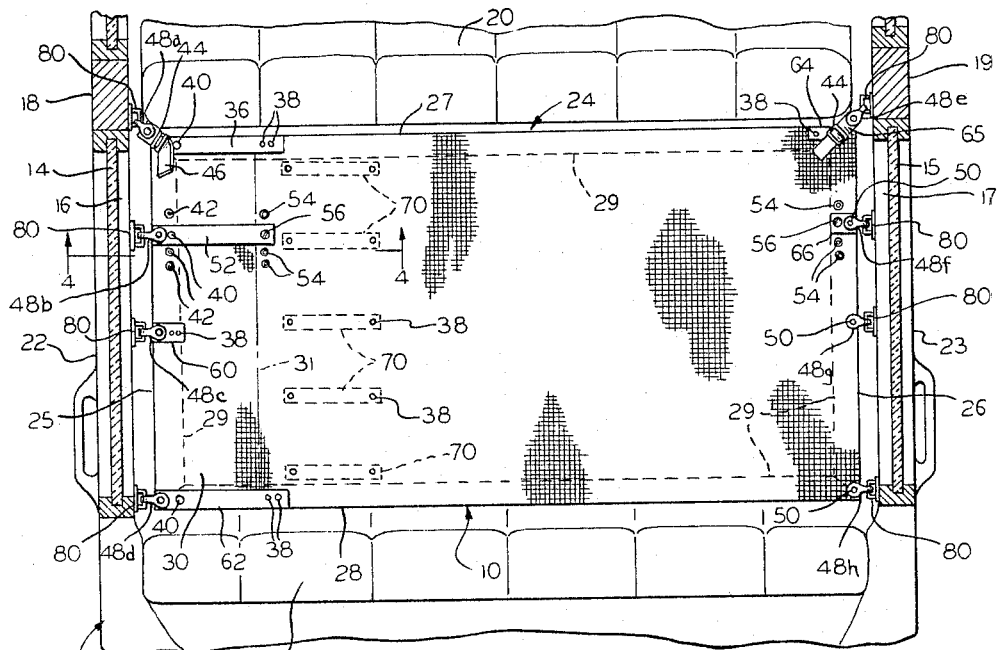
FIG. 1
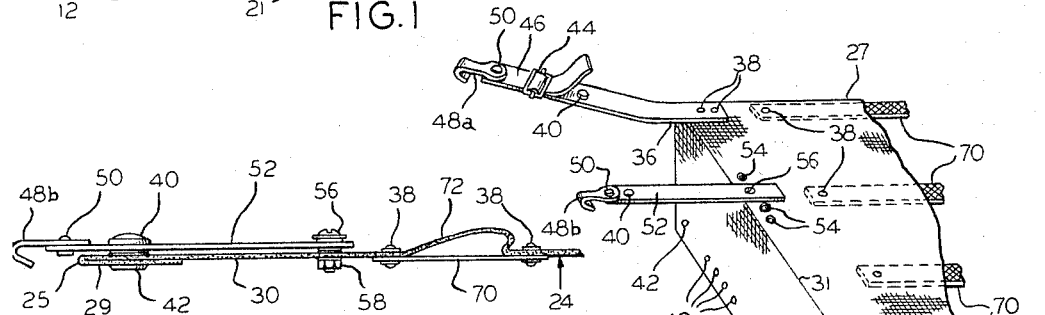
FIG. 4
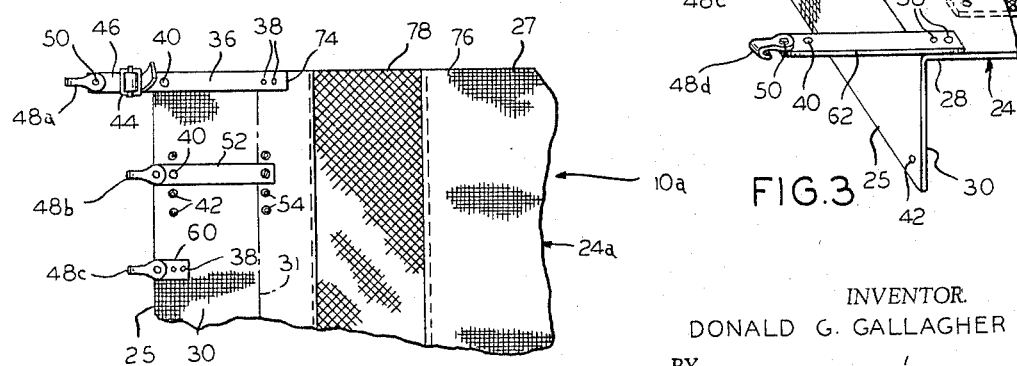
FIG. 5
FIG. 3
INVENTOR.
DONALD G. GALLAGHER
BY John S. O'Brien
ATTORNEY

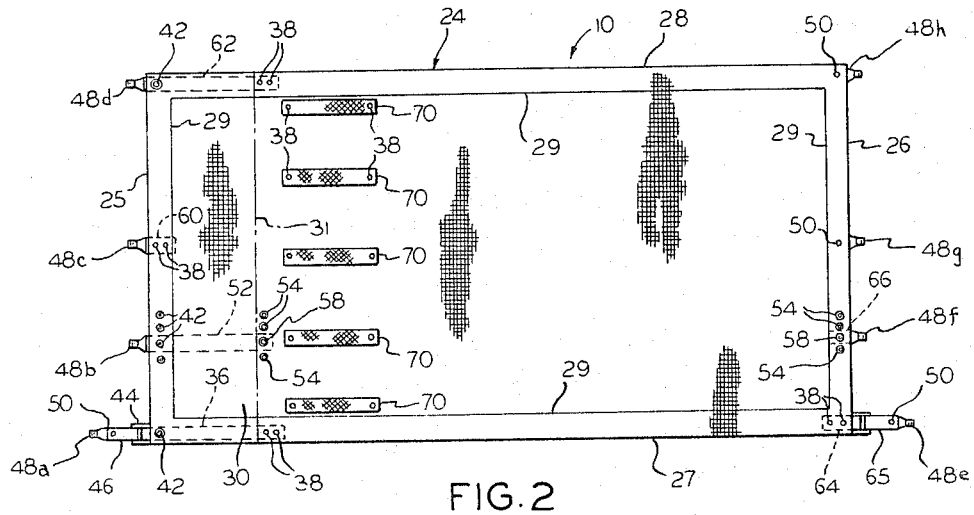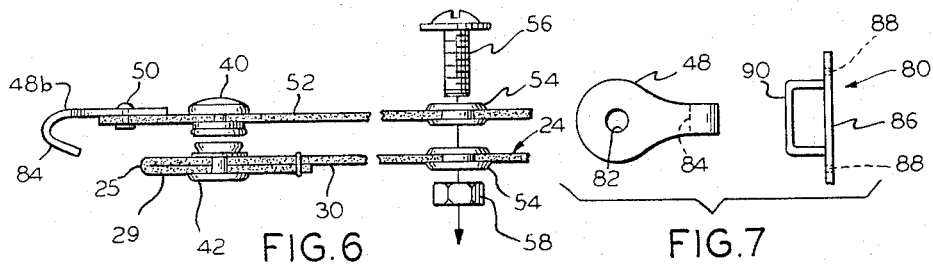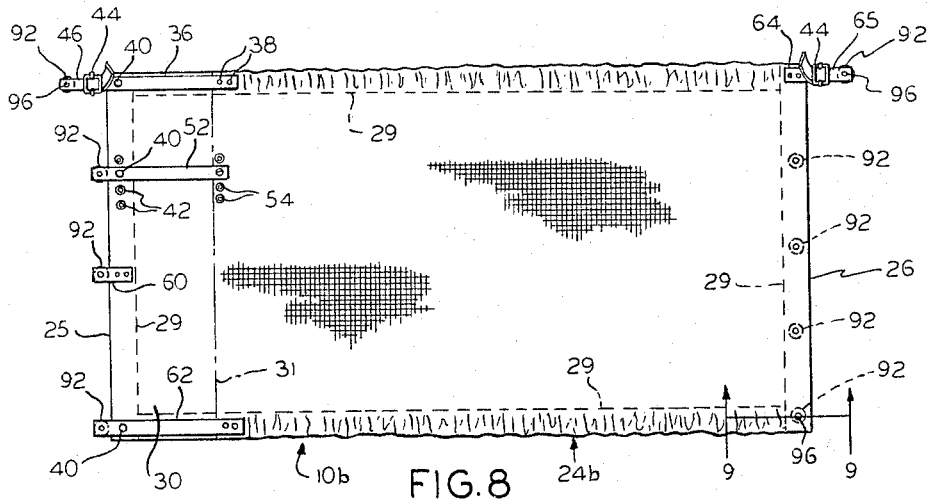

United States Patent Office

3,276,512
Patented Oct. 4, 1966

3,276,512
COVER FOR THE INTERIOR OF AN AUTOMOBILE
Donald G. Gallagher, 3823 W. Schubert, Chicago, Ill.
Filed Dec. 16, 1963, Ser. No. 330,719
7 Claims. (Cl. 160—368)

This invention relates to a cover mountable in an automobile across the interior thereof. More particularly, the invention relates to a cover that extends betwen opposite sides of an automobile and is removably attached thereto to support the cover over the area between the sides.

The theft of articles from automobiles containing loose personal belongings, merchandise, and other articles constitutes a serious problem. There is always danger that such articles will be stolen when the automobile is left unattended. The danger is greatest when the articles can be seen from the outside, such as when the articles are carried in the passenger compartments of automobiles and are visible through the car windows.

An important object of the present invention, is to provide a cover that extends across the interior of an automobile to cover articles contained therein, and, particularly, a cover that may be arranged to cover all or part of the area between the sides of an automobile, at the option of the user. More particularly, it is an object to provide a cover having a flap that may be moved to permit some articles to extend both above and below the cover while covering other articles. In this manner, clothing and other items may be hung in the automobile, or larger articles may be carried, while other articles are confined in the bottom of the automobile interior and covered.

The new cover is especially advantageous for concealing all or part of the loose articles in an automobile from view, thereby substantially reducing the risk of theft. An accompanying advantage is that the cover improves the appearance of the automobile from the outside when the internal contents are disarranged or unattractive. The cover may, at the same time or alternatively, serve as a dust cover for articles being carried, provide wind protection, or protect articles from the sun.

Another object is to provide a cover of the foregoing description which includes means for removably attaching it to the sides of an automobile for support, and means for supporting the flap in a covering position with the remainder of the cover while yet permitting the flap to be moved from its covering position to accommodate articles hanging in the automobile or otherwise extending on both sides of the cover. A more particular object is to provide a cover having support straps which cooperate with the flap in accomplishing the foregoing objects.

An additional object is to provide a cover accomplishing the foregoing objects which also is adjustable to accommodate the structural differences among automobiles.

A further object is to provide a cover having magnetic means for attachment to metal parts such as window moldings, with no requirement for additional attachment means on the automobile.

Another object is to provide a cover of the foregoing description in combination with an enclosed automobile, such as a passenger sedan, station wagon, bus, or panel truck, wherein the cover is mounted beneath the window level of the automobile to furnish protection for its contents.

These and other objects, advantages and functions of the invention will be apparent on reference to the specification and to the attached drawings illustrating preferred embodiments of the invention, wherein like parts are identified by like reference symbols in each of the views, and wherein:

FIGURE 1 is a top plan view of one embodiment of the new cover, illustrating it mounted across the rear seat area of a passenger sedan, a part of which is illustrated in horizontal cross section;

FIG. 2 is a bottom plan view of the cover;

FIG. 3 is an enlarged fragmentary perspective view of one end of the cover, illustrating a movable flap thereof in a dropped position;

FIG. 4 is an enlarged fragmentary longitudinal sectional view of the cover, taken on line 4—4 of FIG. 1;

FIG. 5 is a fragmentary top plan view of one corner of another embodiment of the cover;

FIG. 6 is an enlarged fragmentary exploded longitudinal sectional view similar to FIG. 4, illustrating fastening means employed in the illustrative embodiments;

FIG. 7 is an exploded top plan view of attachment members employed in the illustrative embodiments;

FIG. 8 is a top plan view of another embodiment of the new cover; and

FIG. 9 is an enlarged fragmentary longitudinal sectional view of the embodiment of FIG. 8, taken on line 9—9 thereof.

In its preferred embodiments, the invention provides a cover mountable in an automobile across the interior thereof, which includes a covering sheet or the like extending substantially for the internal width of an automobile and having opposite ends disposed adjacent opposite sides of the automobile. The covering sheet includes a movable flap at one of its ends. A plurality of attachment means are provided on the covering sheet at each of its ends, for removably attaching the ends to the sides of the automobile to support the sheet over the area between the sides. Means are provided for supporting the flap with the remainder of the covering sheet to cover substantially the entire area between the sides of the automobile, while yet permitting the flap to be moved from its covering position out of the way of articles which extend both above and below the sheet while the latter remains supported by the attachment means.

Referring to the drawings, a cover 10 is illustrated in FIG. 1 as it appears when mounted across the rear seat area of a six-passenger sedan 12 or the like. The cover is mounted below the door windows 14 and 15, on the window moldings 16 and 17, and on the center posts 18 and 19. The cover extends over substantially the entire area between the back of the front seat 20 and the front of the back seat 21 and between the left and right sides 22 and 23 of the automobile.

The cover 10 includes a rectangular covering sheet 24 or the like which preferably constitutes a natural or synthetic fabric, natural or artificial leather, plastic sheet material, or the like. It is most desirable that the covering sheet be opaque, so as to obscure from view articles lying under the cover, and opacity also provides protection from the effects of sunlight. The sheet preferably is flexible enough to be folded and also to be extended and retracted, as subsequently described.

Referring also to FIGS. 2-4, the covering sheet 24 has opposite end margins 25 and 26, and front and rear side margins 27 and 28, respectively. A hem 29 is formed around the sheet along each of its margins. The sheet includes an integral transverse drop flap or panel 30 which extends from the front side margin 27 to the rear side margin 28 and forms one end of the sheet. The sheet end margin 25 constitutes the outer end margin of the flap. The flap has an approximate inner end margin or fold line, 31, illustrated in full line in FIG. 3 and in phantom line in other views. The inner end margin is generally parallel to the outer end margin, and the distance between the end margins is such as to provide a flap of a size suitable for the intended purposes. In the preferred illustrative embodiments, the flap is at the normally left side 22 of the automobile.

A plurality of attachment means are mounted along each of the end margins 25 and 26 of the covering sheet, for removably attaching the ends to the respective automobile sides 22 and 23 with the ends in close proximity to the sides. At the flap end of the sheet, a front corner flap holding strap 36 of webbing or other suitable material is fastened to the hem 29 at the normally front margin 27 of the sheet. The strap extends longitudinally from the outer end margin 25 of the flap to a point adjacent to and inwardly beyond its inner end margin 31, where the inner end of the strap is fastened securely by rivets 38 or other suitable fastening means. A female snap fastener component 40 is secured on the strap near its outer end, and a male snap fastener component 42 is secured on the hem of the flap near its outer end. The outer end of the flap is detachably fastened to the outer end of the strap by means of the fastener components. A belt buckle 44 is secured to the outer end of the strap. An adjustment strap 46 is inserted through the buckle, and an attachment hook 48a is secured to the outer end of the adjustment strap by a rivet 50.

An intermediate flap holding strap 52 is spaced transversely from the corner strap 36 and is transversely adjustably fastened to the covering sheet 2. The intermediate strap extends longitudinally from the outer end margin 25 of the flap to a point adjacent to and beyond its inner end margin 31. Four grommets or eyelets 54 are secured on the sheet in alignment in a transverse row adjacent the inner flap margin. A like grommet 54 is secured to the inner end of the strap. The inner end of the strap is fastened to the covering sheet by a bolt 56 inserted through the grommets and secured by a nut 58, in the manner illustrated in FIG. 6. The inner end of the strap may be fastened in a selected transverse position at the location of any one of the grommets 54 on the sheet. Four male snap fastener components 42 are secured on the hem of the flap in a transverse row adjacent its outer margin 25, in longitudinal alignment with the row of grommets 54 on the sheet. A female snap fastener component 40 is secured to the intermediate strap adjacent its outer end. The female component cooperates with one of the male components in the row to detachably fasten the outer end of the flap to the outer end of the strap. In this manner, the flap may be fastened to the strap at a selected transverse position corresponding to the selected strap position. An attachment hook 48b is secured to the outer end of the strap by a rivet 50.

An intermediate edge supporting strap 60 is spaced transversely from the intermediate flap holding strap 52. The edge supporting strap is fastened to the hem of the flap adjacent to its outer end margin 25 by rivets 38. An attachment hook 48c is secured to the outer end of the strap by means of a rivet 50.

A rear corner flap holding strap 62 is spaced from the edge supporting strap 60 and fastened to the hem of the covering sheet at the normally rear margin 28 thereof. The rear corner strap extends longitudinally from the outer end margin 25 of the flap to a point adjacent to and beyond its inner end margin 31, where the inner end of the strap is fastened by rivets 38. A female snap fastener component 40 is secured on the strap near its outer end, and a male snap fastener component 42 is secured on the hem of the flap near its outer end. The outer end of the flap is detachably fastened to the outer end of the strap by the fastener components. An attachment hook 48d is secured to the outer end of the strap by a rivet 50.

At the opposite end of the covering sheet 24, a front corner edge supporting strap 64 is fastened to the hem 29 at the front margin 27 by rivets 38. A buckle 44 is attached to the outer end of the strap. An adjustment strap 65 is inserted in the buckle. An attachment hook 48e is secured to the outer end of the adjustment strap by a rivet 50.

An intermediate edge supporting strap 66 is spaced transversely from the corner strap 64 and is transversely adjustably fastened to the covering sheet. Four grommets 54 are secured on the hem 29 in alignment in a transverse row adjacent the end margin 26, and a like grommet is secured on the edge supporting strap. The grommets on the hem are in longitudinal alignment with the row of grommets adjacent the inner flap margin 31 and with the row of fastener components 42 on the hem of the flap at the opposite end of the sheet. A bolt 56 is inserted through the grommets 54 on the hem and secured by a nut 58, in the manner illustrated for the parts bearing the same numbers in FIG. 6. The edge supporting strap may be fastened in a selected transverse position at the location of any one of the grommets on the hem. An attachment hook 48f is secured to the outer end of the strap by a rivet 50.

An intermediate edge supporting attachment hook 48g is spaced transversely from the adjustable edge supporting strap 66. The hook is secured directly to the hem 29 at the end margin 26 by a rivet 50. A rear corner edge supporting attachment hook 48h is spaced transversely from the intermediate hook 48g. The corner hook is secured to the hem 29 at the end margin 26 by a rivet 50.

Five elastic strips 70 are arranged on the under surface of the covering sheet 24 in a transverse row of spaced parallel longitudinal strips near the inner flap margin 31 and inwardly thereof. The elastic strips are secured to the sheet at their opposite ends by means of rivets 38. When the elastic strips are in their contracted condition, the sheet section 72 between the rivets is contracted or slack, as illustrated in FIG. 4. The sheet 24 may be extended longitudinally until the slack is taken up, while the elastic strips are stretched.

In an alternative embodiment of a cover 10a illustrated in FIG. 5, a covering sheet 24a is formed of two longitudinally spaced apart sections 74 and 76, and the sections are joined by an elastic fabric panel 78 extending transversely between the front and rear side margins of the sheet. The elastic panel functions in the same manner as the elastic strips 70 in the preceding embodiment, and its hiding power is comparable to the material forming the remainder of the covering sheet. The cover 10a otherwise is constructed and functions in the same manner as the preceding embodiment, and the parts are numbered correspondingly.

The cover 10 or 10a may be supported by engagement of the attachment hooks 48a–h with attachment brackets 80 mounted on the automobile, as illustrated in FIG. 1. The attachment members are shown in greater detail in FIG. 7. A hook 48 of the type employed includes a body portion having a central mounting hole 82 therein for receiving a rivet, and a projecting portion having a reverse bend 84 on its outer end. The bracket 80 includes a flat base strip 86 having a pair of holes 88 therein for insertion of screws or bolts. A rectangular loop 90 is secured on the base strip and projects outwardly therefrom. The hook is attached to the bracket by engaging the hook end 84 and the bracket loop 90.

The hook and bracket members represent one preferred embodiment of attachment means. The brackets may be mounted on an automobile in desired locations, and they are constructed to avoid catching on other articles. Several brackets may be combined on a longer base strip when the bracket locations are relatively fixed. The cover is readily attached by connecting the hooks to the brackets. Alternatively, other attachment means may be employed, e.g., snap fasteners, and pin and slot type fasteners. A preferred embodiment of magnetic attachment means is described subsequently.

Loose articles frequently are placed on the floor in the rear seat area of a passenger sedan or the like for convenience, and it may be desirable also to place articles on the rear seat. The new cover of the invention furnishes maximum security by covering both the floor area and the seat area. As seen in FIG. 1, three brackets 80 are mounted on each of the lower rear door window moldings 16 and 17. A bracket is also mounted on each of the center posts 18 and 19. The brackets are aligned horizontally and are spaced apart for distances approximately equal to the spacing of the straps and hooks on the cover 10 or 10a. The adjustable attachment members on the cover accommodate different automobile designs. In particular, the transversely adjustable intermediate straps 52 and 66 at opposite ends of the covering sheet 24 allow their brackets 80 to be mounted in the most convenient locations on the car doors. The adjustment straps 46 and 65 attached to the respective front corner straps 36 and 64 may be attached to brackets 80 conveniently mounted on the center posts 18 and 19, or on other structure adjacent to the front seat 20. In this manner, the cover is adaptable to various types of automobiles, such as two- and four-door sedans, convertibles, and both standard and compact automobiles.

Where the depth of the rear seat area, from front to back, is reduced as in compact automobiles, the front section of the cover along the margin 27 may be dropped. In this case, the cover is supported at the front by the adjustable intermediate straps 52 and 66. Since the straps may be adjusted transversely, the corresponding brackets 80 may be located in the most desirable positions near the front seat. Alternatively, the rear section of the cover along the margin 28 may be dropped. In this case, the cover is supported at the back by the fixed intermediate strap 60 and hook 48g.

The cover is equally useful in station wagons, buses and other types of vehicles which afford a view of the interior, such as panel trucks. The cover can be mounted between seats in a station wagon or a bus, and it can be mounted between the rear seat and the back door thereof. Thus, brackets may be provided on the lower window moldings of the rear side windows, and the cover may be attached thereto and supported over the entire load carrying area at the back of the vehicle.

When the cover 10 is supported as illustrated in FIG. 1, the rear seat area is completely covered. At this time, the outer end of the flap 30 is supported by the snap fastener components 40 and 42 for the several flap holding straps 36, 52, and 62. The outer end of the flap is also supported by the edge supporting strap 60. Frequently, it is desirable to hang a garment or garments from a hook or the like provided for the purpose above the rear door of an automobile. It is preferable for maximum visibility in driving to hang the garments on the left side. Also, it may be desired to carry other articles which extend both above and below the cover, particularly, articles which due to their size or shape cannot be confined beneath the cover. For these purposes, the several snap fastener components 40 and 42 are unsnapped, and the edge supporting strap 60 is unhooked from its bracket 80. The flap 30 then may be dropped as shown in FIG. 3, to leave an opening between the flap rear margin 31 and the adjacent side 22 of the automobile. The inner ends of the flap holding straps 36, 52 and 62 being fastened to the covering sheet 24 by the rivets 38 and the bolt 56 in one of the sheet grommets 54, the covering sheet remains supported by the straps and their associated hooks 48a, b, and d attached to respective brackets 80. The rivets and the sheet grommets are substantially aligned transversely so that the flap bends therealong, and the resulting fold line constitutes its rear margin 31.

Clothing may be hung so that it extends through the opening provided by moving the flap, thereby hanging freely. Other articles may be suspended above the cover or supported on the floor or seat below the cover and extend through the opening. Articles of greater width may be accommodated by detaching the intermediate flap holding strap 52 from its bracket 80 and dropping the strap. The remainder of the rear seat area continues to be covered by the remainder of the covering sheet 24, and articles beneath the remainder of the sheet are covered and concealed from view. When the clothing is removed from its support or other articles extending above and below the cover are removed, and it is no longer necessary that the flap 30 be moved out of their way, the flap is raised and its snap fastener components 42 are engaged with the components 40 on the flap holding straps 36, 52 and 62. The hook 48c on the edge supporting strap 60 is hooked on its bracket 80. The cover then extends over substantially the entire rear seat area. The flap may be manipulated in this manner as often as desired and very conveniently to provide maximum protection.

The cover is employed similarly in automobiles having rear seat areas of reduced depth. The cover then may be supported at the front by the adjustable intermediate flap holding straps 52 and 66 while the front section along the margin 27 is dropped, as previously described. The flap 30 is supported in its covering position when its fastener components 42 are joined to the fastener components 40 on the flap holding straps 52 and 62. The flap may be dropped by separating the fastener components and unhooking the edge supporting strap 60.

The elastic strips 70 on the cover 10 and the elastic panel 78 on the cover 10a accommodate varying widths among automobiles. With relatively narrow interiors, the covering sheet 24 is contracted in the manner illustrated in FIG. 4. With wider interiors, the elastic stretches and the slack section 72 is extended to accommodate the greater width. In the embodiment of FIG. 5, the greater width is accommodated by stretching the elastic panel 78. The covering sheet 24 or 24a is maintained relatively taut over the covered area in this manner, so that it does not drape on concealed articles and give an indication that such articles are in fact being carried in the automobile.

The hooks 48a–h are removed readily from their brackets 80 on either or both sides of the automobile. When it is desired to open one of the doors, the hooks attached to one of the window moldings 16 and 17 may be detached. All of the hooks may be detached when the cover is not being used, and the cover may be folded neatly and compactly. It may be stored in a convenient location, such as the automobile glove compartment.

Another embodiment of a cover 10b illustrated in FIGS. 8 and 9 is similar to the preceding embodiments, and like parts are indicated by like reference numerals. The cover includes a covering sheet 24b having an integral drop panel 30. Circular permanent magnets 92 replace the attachment hooks 48a–h of the preceding embodiments, and front and rear marginal elastic strips 94 replace the elastic components of the preceding embodiments. The parts present at the flap 30 otherwise are the same. Thus, the front corner flap holding strap 36 is provided, together with the adjustment strap 46 and the buckle 44. A magnet 92 is secured to the outer end of the adjustment strap by a rivet or pin 96. The transversely adjustable intermediate flap holding strap 52 is provided, and a magnet is likewise secured to its outer end. The intermediate edge supporting strap 60 is provided, and a magnet is secured to its outer end. The rear corner flap holding strap 62 is provided, and a magnet is secured to its outer end.

At the opposite end of the covering sheet 24b, the front corner edge supporting strap 64 is provided, and the adjustment strap 65 is joined thereto by a buckle 44. A magnet 92 is secured to the outer end of the adjustment strap. Four additional magnets are spaced transversely across the remainder of the covering sheet end, adjacent the end margin 26. The magnets may be secured within the hem 29, as illustrated in FIG. 9.

The provision of the magnets 92 as attachment means on the cover 10b enables the cover to be mounted on the metal parts of an automobile, such as window moldings and frame structure with no necessity for additional attachment means on the automobile. The cover may be shifted somewhat, since the magnets need not be aligned with other attachment members. At the same time, the adjustable front corner straps 36, 46 and 64, 65, and the adjustable intermediate flap holding strap 52 provide for adjustment to accommodate the structures of different automobiles while the covering sheet 24b extends over the area which it is desired to cover.

The marginal elastic strips 94 extend substantially for the distance between the inner end margin 31 of the flap 30 and the hem 29 adjacent the more distant sheet end margin 26. The covering sheet 24b is contracted for most of its length by the elastic when used in relatively narrow automobile interiors, and it is extended over most of its length when used in wider interiors, with the elastic stretching accordingly.

The invention thus provides a cover which readily is mounted across the interior of an automobile to conceal and protect articles being carried, and which may be removed easily and stored in a convenient location when not being used. The drop flap is very useful for accommodating articles which are suspended in the automobile or which cannot be covered in the lower area, while other articles are covered. The adjustable construction renders a single cover useful in automobiles of diverse types and designs. The cover is an economical accessory item which provides low cost protection against theft while also performing other protective functions.

It will be apparent that various changes and modifications may be made in the construction and arrangement of the parts of the new cover within the spirit and scope of the invention. It is intended that such changes and modifications be included within the scope of the appended claims.

I claim:

1. A cover mountable in an automobile across the interior thereof comprising a covering sheet extending for substantially the internal width of an automobile and having opposite ends disposed adjacent opposite sides of the automobile, said covering sheet including a movable flap forming one of said ends, and a plurality of attachment means on said covering sheet at each of said ends for removably attaching the ends to the sides of the automobile to support the sheet over the area between said sides, said attachment means at said one end including transversely spaced straps, means for fastening said straps to said covering sheet inwardly beyond said flap, and means for detachably fastening said flap to said straps, whereby said flap is supported with the remainder of said covering sheet to cover substantially the entire area between said sides when the flap is fastened to said straps, and the flap may be moved from its covering position out of the way of articles which extend both above and below the covering sheet while the latter remains supported by said attachment means when the flap is detached from said straps.

2. A cover as defined in claim 1 wherein said attachment means include permanent magnets attachable to the sides of the automobile.

3. A cover mountable in an automobile across the interior thereof comprising a covering sheet extending for substantially the internal width of an automobile and having opposite ends disposed adjacent opposite sides of the automobile, said covering sheet including a movable flap forming one of said ends, elastic means on said covering sheet for extending and contracting the sheet between said ends to accommodate diverse automobile widths, and a plurality of attachment means on said covering sheet at each of said ends for removably attaching the ends of the sides of the automobile to support the sheet over the area between said sides, said attachment means at said one end including transversely spaced straps, means for fastening said straps to said covering sheet inwardly beyond said flap, and means for detachably fastening said flap to said straps, whereby said flap is supported with the remainder of said covering sheet to cover substantially the entire area between said sides when the flap is fastened to said straps, and the flap may be moved from its covering position out of the way of articles which extend both above and below the covering sheet while the latter remains supported by said attachment means when the flap is detached from said straps.

4. A cover mountable in an automobile across the interior thereof comprising a rectangular covering sheet extending for substantially the internal width of an automobile and having opposite ends disposed adjacent opposite sides of the automobile, said covering sheet including a movable flap forming one of said ends, and a plurality of attachment means on said covering sheet at each of said ends for removably attaching the ends to the sides of the automobile to support the sheet over the area between said sides, said attachment means at said one end including corner straps and an intermediate strap therebetween, means for fastening said straps to said covering sheet inwardly beyond said flap, said fastening means including means for fastening said intermediate strap in a selected one of a plurality of transverse positions, and means for detachably fastening said flap to said straps, said latter fastening means including means for fastening said flap to said intermediate strap at a selected one of a plurality of transverse positions corresponding to said selected strap position, whereby said flap is supported with the remainder of said covering sheet to cover substantially the entire area between said sides when the flap is fastened to said straps, and the flap may be moved from its covering position out of the way of articles which extend both above and below the covering sheet while the latter remains supported by said attachment means when the flap is detached from said straps.

5. A cover mountable in an automobile across the interior thereof comprising a rectangular covering sheet extending for substantially the internal width of an automobile and having opposite ends disposed adjacent opposite sides of the automobile, said covering sheet including a movable flap forming one of said ends, and an attachment means on said covering sheet at each corner thereof for removably attaching said ends to the sides of the automobile to support the sheet over the area between said sides, said attachment means including a pair of strap means adjustable in length disposed at respective ends adjacent one side margin of said covering sheet and a strap means at said one end adjacent the opposite side margin of said sheet, means for fastening said strap means at said one end to said covering sheet inwardly beyond said flap, and means for detachably fastening said flap to said strap means at said one end, whereby said flap is supported with the remainder of said covering sheet to cover substantially the entire area between said sides when the flap is fastened to said strap means at said one end, and the flap may be moved from its covering position out of the way of articles which extend both above and below the covering sheet while the latter remains supported by said attachment means when the flap is detached from said strap means at said one end.

6. A cover as defined in claim 5 including an intermediate attachment member at each of said ends disposed between said corner attachment means thereat, means for fastening each of said intermediate attachment members to said covering sheet in a selected one of a plurality of transverse positions, said intermediate attachment member at said one end including a strap fastened to said covering sheet inwardly beyond said flap in said selected position, and means for detachably fastening said flap to said strap at a selected one of a plurality of transverse positions corresponding to said selected strap position.

7. A cover as defined in claim 5 including elastic means on said covering sheet for extending and contracting the sheet between said ends to accommodate diverse automobile widths.

References Cited by the Examiner
UNITED STATES PATENTS

| | | |
|---|---|---|
| 1,744,177 | 1/1930 | Schuler. |
| 2,139,156 | 12/1938 | Gill. |
| 2,595,833 | 5/1952 | Flaherty. |
| 2,639,751 | 5/1953 | Flaherty. |

HARRISON R. MOSELEY, *Primary Examiner.*

P. C. KANNAN, *Assistant Examiner.*